(12) United States Patent
Sakurai et al.

(10) Patent No.: US 12,353,067 B2
(45) Date of Patent: Jul. 8, 2025

(54) LIQUID CRYSTAL DEVICE, OPTICAL SYSTEM, SPATIAL PHASE MODULATOR, AND METHOD OF MANUFACTURING LIQUID CRYSTAL DEVICE

(71) Applicants: santec Holdings Corporation, Aichi (JP); Sanyo-Onoda City Public University Corporation, Yamaguchi (JP)

(72) Inventors: Yasuki Sakurai, Aichi (JP); Masashi Nishitateno, Aichi (JP); Koki Takatou, Yamaguchi (JP); Masahiro Ito, Yamaguchi (JP)

(73) Assignees: santec Holdings Corporation, Aichi (JP); Sanyo-Onoda City Public University Corporation, Yamaguchi (JP)

( * ) Notice: Subject to any disclaimer, the term of this patent is extended or adjusted under 35 U.S.C. 154(b) by 0 days.

(21) Appl. No.: 17/794,048

(22) PCT Filed: Jul. 19, 2021

(86) PCT No.: PCT/JP2021/026990
§ 371 (c)(1),
(2) Date: Jul. 20, 2022

(87) PCT Pub. No.: WO2023/002533
PCT Pub. Date: Jan. 26, 2023

(65) Prior Publication Data
US 2024/0192527 A1 Jun. 13, 2024

(51) Int. Cl.
*G02F 1/01* (2006.01)
*G02F 1/1343* (2006.01)
(52) U.S. Cl.
CPC ...... *G02F 1/0136* (2013.01); *G02F 1/134309* (2013.01); *G02F 1/13439* (2013.01)

(58) Field of Classification Search
CPC ............ G02F 1/0136; G02F 1/134309; G02F 1/13439
See application file for complete search history.

(56) References Cited

U.S. PATENT DOCUMENTS

2011/0101270 A1  5/2011  Manabe et al.
2016/0103342 A1  4/2016  Hong et al.
(Continued)

FOREIGN PATENT DOCUMENTS

JP   H09291282 A   11/1997
JP   H1036847 A    2/1998
(Continued)

OTHER PUBLICATIONS

Translation of International Preliminary Report on Patentability mailed Feb. 1, 2024 in PCT/JP2021/026990 (Form PCT/IB/338, Form PCT/IB/373, and Form PCT/ISA/237) (7 pages).
(Continued)

*Primary Examiner* — Nathanael R Briggs
(74) *Attorney, Agent, or Firm* — Meunier Carlin & Curfman LLC

(57) ABSTRACT

A liquid crystal device according to one aspect of the present disclosure includes a liquid crystal layer and an electrode layer. The electrode layer is configured to create an electric field in the liquid crystal layer. The liquid crystal layer includes a liquid crystal composition that includes a liquid crystal mixture, to which a polymerization inhibitor for inhibiting radical polymerization caused by light action is added. In particular, the liquid crystal layer includes the liquid crystal composition in which a hindered amine based organic compound is added to the liquid crystal mixture as the polymerization inhibitor.

11 Claims, 4 Drawing Sheets

(56) References Cited

U.S. PATENT DOCUMENTS

| | | |
|---|---|---|
| 2021/0063788 A1 | 3/2021 | Okazaki |
| 2021/0221224 A1 | 7/2021 | Christmas |
| 2023/0288719 A1* | 9/2023 | Mitobe .................... G02B 5/18 |

FOREIGN PATENT DOCUMENTS

| | | | |
|---|---|---|---|
| JP | 12005100609 A | | 4/2005 |
| JP | 2006169472 A | | 6/2006 |
| JP | 20100197450 A | | 9/2010 |
| JP | 2011519985 A | | 7/2011 |
| JP | 2014012836 A | | 1/2014 |
| JP | 2020076826 A | * | 5/2020 |

OTHER PUBLICATIONS

Office Action mailed Oct. 30, 2023 in U.S. Appl. No. 17/766,419 (12 pages).

Office Action mailed Jun. 8, 2023 in U.S. Appl. No. 17/766,419 (12 pages).

Notices of Reason(s) for Rejection issued on Jan. 10, 2023 in the corresponding Japanese Patent Application No. 2021-551064 with English machine translation (9 pages).

Notices of Reason(s) for Rejection issued on Jan. 10, 2023 in the corresponding Japanese Patent Application No. 2022-507740 with English machine translation (15 pages).

Yasuki Sakurai "Laser Processing Technique using LCOS Technology"; pp. 129-133; Ekisho, vol. 2, No. 22; published in Japan by the Japanese Liquid Crystal Society on Apr. 25, 2018 attached with Machine Translation.

Yasuki Sakurai, Masashi Nishitateno, Masahiro Ito and Kohki Takatoh, "UV Durable LCOS for Laser Processing" by Crystals 2021.

International Preliminary Report on Patentability in International Application No. PCT/JP2019/040126, mailed Apr. 21, 2022, 9 pages.

International Search Report in International Application No. PCT/JP2019/040126, mailed Dec. 10, 2019, 2 pages.

International Search Authority in International Application No. PCT/JP2021/026990, mailed Jul. 19, 2021, 11 pages.

* cited by examiner

LIQUID CRYSTAL DEVICE, OPTICAL SYSTEM, SPATIAL PHASE MODULATOR, AND METHOD OF MANUFACTURING LIQUID CRYSTAL DEVICE

TECHNICAL FIELD

The present disclosure relates to a liquid crystal device, an optical system, and a spatial phase modulator.

BACKGROUND ART

As a liquid crystal device, an LCOS (Liquid Crystal On Silicon) device is already known. In recent years, LCOS devices developed for display use have been beginning to be applied in various fields.

For example, applications of the LCOS devices as spatial phase modulators have been studied in technical fields of optical communication technology, laser processing technology, compensation optics technology, optical manipulation technology, pulse/spectrum shaping technology, and the like. The inventor of the present disclosure has already disclosed a laser processing system using an LCOS device (see, Non-Patent Document 1).

PRIOR ART DOCUMENTS

Non-Patent Document

Non-Patent Document 1: Yasuki SAKURAI "Laser Processing Technique using LCOS Technology"; pages 129-133; EKISHO, vol. 2, No. 22; published in Japan by the Japanese Liquid Crystal Society on Apr. 25, 2018.

SUMMARY OF THE INVENTION

Problems to be Solved by the Invention

In a laser processing system using an LCOS device, a processing-target surface can be processed in one shot by using an LCOS phase-modulated image generated through Computer Generated Hologram (CGH). Such an LCOS device is therefore expected to have significantly improved processing performance compared to conventional scanning-type laser processing systems.

However, publicly known liquid crystal devices including the LCOS devices do not have enough durability against an input of high-energy light; and therefore, those liquid crystal devices are susceptible to damage. One cause of such damage is heat generation due to light absorption of a material included in the liquid crystal devices.

The inventor of the present disclosure has already disclosed a technique to inhibit heat generation due to light absorption by selecting materials to be included in the liquid crystal devices. However, more improvement can still be made in terms of durability of the liquid crystal devices against an input of high-energy light.

Now, one aspect of the present disclosure desirably provides a new technique that enables improvements in durability of a liquid crystal device.

Means for Solving the Problems

One aspect of the present disclosure provides a liquid crystal device. The liquid crystal device includes a liquid crystal layer, and an electrode layer. The electrode layer is configured to create an electric field in the liquid crystal layer. The liquid crystal layer includes a liquid crystal composition that includes a liquid crystal mixture, to which a polymerization inhibitor for inhibiting radical polymerization caused by light action is added.

According to one aspect of the present disclosure, the liquid crystal layer includes a liquid crystal composition in which a hindered amine based organic compound is added to the liquid crystal mixture as the polymerization inhibitor. By using the hindered amine based organic compound as the polymerization inhibitor, durability of the liquid crystal layer against light incidence is improved compared with a case of using a phenol based organic compound. Accordingly, one aspect of the present disclosure can improve the durability of the liquid crystal device against the light incidence.

According to one aspect of the present disclosure, the liquid crystal layer may include a liquid crystal composition in which a monofunctional hindered amine based organic compound is added to the liquid crystal mixture as the polymerization inhibitor. According to one aspect of the present disclosure, the liquid crystal layer may include a liquid crystal composition in which a bifunctional hindered amine based organic compound is added to the liquid crystal mixture as the polymerization inhibitor.

According to one aspect of the present disclosure, the bifunctional hindered amine based organic compound may be a hindered amine based organic compound including two functional groups coupled by a linking group including carbon-to-carbon bond having carbon number 3 or less. A use of the hindered amine based organic compound having short molecular chains as the polymerization inhibitor makes it possible to inhibit an alignment of the liquid crystal molecules from physically inhibited by adding such polymerization inhibitor.

According to one aspect of the present disclosure, the hindered amine based organic compound added as the polymerization inhibitor may include an aromatic ring structure and an alkyl group structure having carbon number 5 or more. Solubility of the polymerization inhibitor to the liquid crystal mixture is improved by using such hindered amine based organic compound.

According to one aspect of the present disclosure, the liquid crystal mixture may include, as a main component, a liquid crystalline compound having no fluorine atoms at its terminal. A use of such liquid crystal mixture can inhibit the liquid crystal layer from being damaged by defluoridation due to light irradiation on the liquid crystal layer.

According to one aspect of the present disclosure, the liquid crystal layer may be driven such that liquid crystal molecules rotate vertically relative to a surface of the liquid crystal layer without rotating parallel to the surface. A rotation of the liquid crystal molecules parallel to the surface of the liquid crystal layer causes not only phase modulation but also intensity modulation with respect to a light that passes through the liquid crystal layer. Due to a rotation of the liquid crystal molecules vertically relative to the surface of the liquid crystal layer without rotating parallel to the surface, it is possible to inhibit intensity modulation and selectively add phase modulation to the light that passes through the liquid crystal layer.

According to one aspect of the present disclosure, the liquid crystal layer may be formed as a vertical alignment (VA) liquid crystal layer. According to one aspect of the present disclosure, the electrode layer may include a transparent electrode layer and a lower electrode layer. The transparent electrode layer may be positioned above the liquid crystal layer. The lower electrode layer may be positioned below the liquid crystal layer. Alignment films for vertically controlling an initial alignment of liquid crystal molecules in the liquid crystal layer are disposed between the liquid crystal layer and the transparent electrode layer, and between the liquid crystal layer and the lower electrode layer.

In the liquid crystal device having the vertical alignment (VA) liquid crystal layer, the liquid crystal molecules do not rotate parallel to the surface of the liquid crystal layer but rotate vertically relative to the surface of the liquid crystal layer. Therefore, it is possible to selectively add phase modulation to the light that passes through the liquid crystal layer.

According to one aspect of the present disclosure, the liquid crystal mixture may include liquid crystalline compound having a tolan structure. The polymerization inhibitor may inhibit radical polymerization caused by light action to the tolan structure.

In a case where the liquid crystal layer includes a liquid crystal compound having a tolan structure, a polymerization reaction with the chain propagation center being a radical generated by the light action to the tolan structure is likely to occur. It is therefore very productive to include the polymerization inhibitor in the liquid crystal device.

According to one aspect of the present disclosure, the liquid crystal device may be formed as an LCOS device having the electrode layer and the liquid crystal layer interposed between a silicon substrate and a cover glass. Such an LCOS device that can inhibit damage by polymerization reactions caused by the light action, in particular damage by radical polymerization, shows excellent durability in an application that includes an input of high-energy light.

According to one aspect of the present disclosure, an optical system may be provided. The optical system may include a light source, the aforementioned liquid crystal device, and a controller. The aforementioned liquid crystal device may receive an input of a laser light from the light source. The controller may be configured to control the liquid crystal device. The liquid crystal device can be controlled by the controller to modulate the laser light and output thus modulated laser light. According to one aspect of the present disclosure, the liquid crystal device can be used to improve the durability of the system that modulate high-energy light.

According to one aspect of the present disclosure, the liquid crystal device receives an input of a linearly polarized light, as the laser light, that has polarized along a long axis of liquid crystal molecules in the liquid crystal layer. The linearly polarized light that is polarized along the long axis of the liquid crystal molecules can improve phase modulation ability in the liquid crystal layer.

One aspect of the present disclosure can provide a liquid-crystal-type spatial phase modulator. The spatial phase modulator may include a solid material layer, a transparent electrode layer, a first alignment film layer, a liquid crystal layer, a second alignment film layer, a lower electrode layer, and a silicon substrate.

The solid material layer may be a transparent solid material layer. The solid material layer may receive an input of light. The transparent electrode layer may be disposed below the solid material layer. The first alignment film layer may be disposed below the transparent electrode layer. The liquid crystal layer may be disposed below the first alignment film layer.

The second alignment film layer may be disposed below the liquid crystal layer. The lower electrode layer may be disposed below the second alignment film layer. The silicon substrate may be disposed below the lower electrode layer. The transparent electrode layer may be an indium tin oxide (ITO) transparent electrode layer.

The first alignment film layer and the second alignment film layer may be inorganic alignment film layers made of silicon oxide (SiOx). The liquid crystal layer may include a liquid crystal composition that includes a liquid crystal mixture, to which a polymerization inhibitor for inhibiting radical polymerization caused by light action is added. In particular, liquid crystal layer may include a liquid crystal composition in which a hindered amine based organic compound is added to the liquid crystal mixture as the polymerization inhibitor. This spatial phase modulator can effectively inhibit heat damage caused by an input of high-energy light and damage caused by polymerization reaction that occurs in the spatial phase modulator.

According to one aspect of the present disclosure, a method of manufacturing a liquid crystal device may be provided. The method of manufacturing the liquid crystal device may include creating a liquid crystal composition by adding, to a liquid crystal mixture, a hindered amine based organic compound as a polymerization inhibitor for inhibiting radical polymerization caused by light action; and manufacturing the liquid crystal device that includes the liquid crystal layer having a property of inhibiting the radical polymerization by using the liquid crystal composition to form the liquid crystal layer.

EXPLANATION OF REFERENCE NUMERALS

10 . . . laser processing system, 11 . . . light source, 13 . . . beam expanding lens, 15 . . . projection element (spatial phase modulator), 17 . . . controller, 19 . . . imaging lens, 100 . . . spatial phase modulator, 110 . . . silicon substrate, 120 . . . cover glass, 130 . . . transparent electrode layer, 140 . . . first alignment film layer, 150 . . . liquid crystal layer, 160 . . . second alignment film layer, 170 . . . reflecting layer, 180 . . . lower electrode layer, 190 . . . circuit layer.

MODE FOR CARRYING OUT THE INVENTION

Hereinafter, example embodiments of the present disclosure will be explained with reference to the drawings.

A spatial phase modulator 100 of the present embodiment is configured as an LCOS device that has durability against high-energy light. Particularly, this spatial phase modulator 100 is configured as an LCOS device designed for a laser processing use.

In a laser processing system 10, pulsed light having a power with high peak value is emitted. The spatial phase modulator 100, which is used in the laser processing system 10, is thus required to have durability against an input of high-energy pulsed light.

Figure 1:
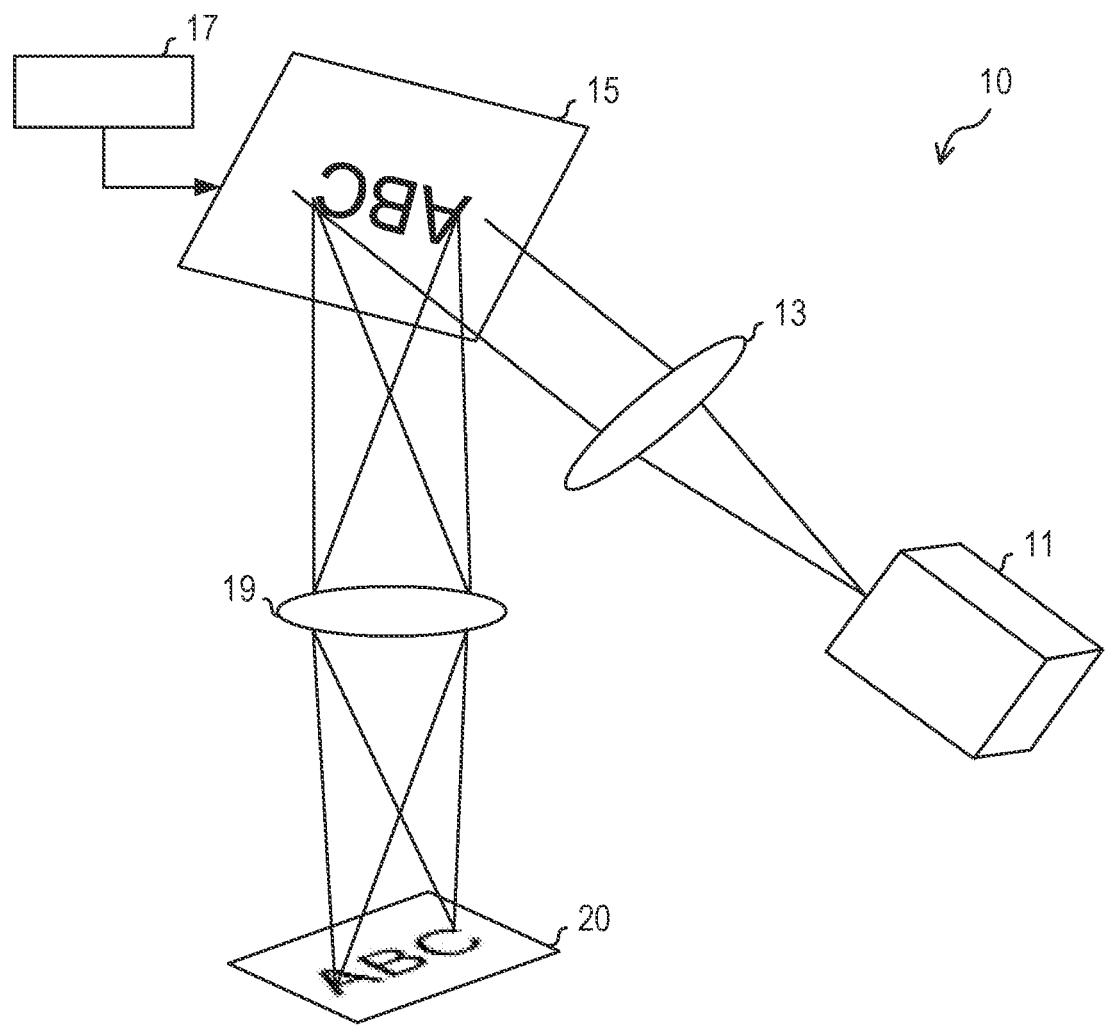
FIG. 1 is a diagram showing a schematic configuration of a laser processing system.

The laser processing system 10 shown in FIG. 1 is an optical system that irradiates a projection element 15 with pulsed light from a light source 11 through a beam expanding lens 13. The spatial phase modulator 100 is installed (assembled) in the laser processing system 10 as this projection element 15.

The spatial phase modulator 100 includes two-dimensionally arranged electrodes corresponding to two or more pixels. The spatial phase modulator 100 is configured to modulate a phase of input light for each pixel by having these electrodes apply voltage to liquid crystal. The spatial phase modulator 100 is controlled by a controller 17 to convert the pulsed light from the light source 11 into phase-modulated light corresponding to an image that should be created on a processing-target surface 20 and output the phase-modulated light.

A phase-modulated image which corresponds to the output light from the spatial phase modulator 100 is created on the processing-target surface 20 through an imaging lens 19. This phase-modulated image serves to process the processing-target surface 20. By using this laser processing system 10, a two-dimensional image can be created on the processing-target surface 20 by a single shot of the pulsed light.

Figure 2:
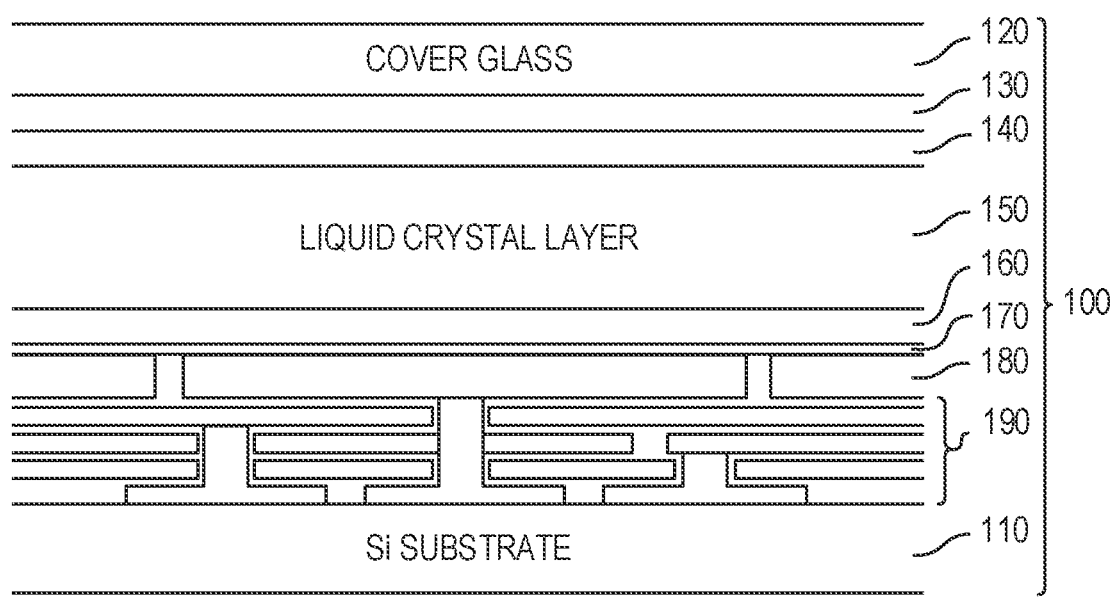
FIG. 2 is a sectional view showing an inner structure of a spatial phase modulator.

As shown in FIG. 2, the spatial phase modulator 100 of the present embodiment includes a cover glass 120, a transparent electrode layer 130, a first alignment film layer 140, a liquid crystal layer 150, a second alignment film layer 160, a reflection layer 170, a lower electrode layer 180, and a circuit layer 190 on a silicon substrate 110.

The cover glass 120 is the uppermost layer of the spatial phase modulator 100 as a solid material layer that is transparent to the pulsed light from the light source 11. The pulsed light from the light source 11 is inputted into the cover glass 120. The transparent electrode layer 130 is disposed below the cover glass 120. The first alignment film layer 140, the liquid crystal layer 150, and the second alignment film layer 160 are disposed below the transparent electrode layer 130.

The first alignment film layer 140 is disposed above and adjacent to the liquid crystal layer 150. The second alignment film layer 160 is disposed below and adjacent to the liquid crystal layer 150. The first alignment film layer 140 and the second alignment film layer 160 are configured as vertical alignment films to control an initial alignment of liquid crystal molecules in the liquid crystal layer 150 to be vertical relative to each layer in the spatial phase modulator 100.

The liquid crystal layer 150 is disposed between the first alignment film layer 140 and the second alignment film layer 160. The liquid crystal layer 150 is affected by the first alignment film layer 140 and the second alignment film layer 160 and is configured as a vertical alignment (VA) liquid crystal layer, in which the liquid crystal molecules are vertically aligned under an electric-field-free state that is a state without an application of a voltage.

The reflection layer 170 is disposed below the second alignment film layer 160 and is configured to reflect the pulsed light, which is inputted into the cover glass 120 from above the spatial phase modulator 100 and propagated through the transparent electrode layer 130, the first alignment film layer 140, the liquid crystal layer 150, and the second alignment film layer 160 in this order.

A reflected light from the reflection layer 170 in response to an input light to the cover glass 120 propagates upwards through the second alignment film layer 160, the liquid crystal layer 150, the first alignment film layer 140, the transparent electrode layer 130, and the cover glass 120 in this order, and then outputted as the phase-modulated light of the input light.

The lower electrode layer 180 includes the aforementioned electrode for each pixel, and together with the transparent electrode layer 130, receives a drive signal from the controller 17 and, in response, applies a voltage on the liquid crystal layer 150 for each pixel. This voltage application forms an electric field in the liquid crystal layer 150. Due to this formation of the electric field, a phase shift occurs in each pixel in the light passing through the liquid crystal layer 150, which enables phase modulation.

In the spatial phase modulator 100, a heat generation that cannot be ignored is caused by absorption of high-energy light. The heat generation may cause thermal damage in the spatial phase modulator 100. Thus, each layer of the spatial phase modulator 100 of the present embodiment is formed of materials that help inhibit the thermal damage.

To inhibit the thermal damage, a material with high thermostability can be selected. Or, a material with good thermal conductivity may be selected to enable fast diffusion of heat. Or, a material with good transmissivity may be selected to inhibit heat generation due to light absorption.

In the present embodiment, the cover glass 120 is made of sapphire. The heat-proof temperature of sapphire is about 2000° C., which is higher than that of a borosilicate glass, a typical cover glass material. The thermal conductivity of sapphire is about 42 W/mK.

The transmissivity of sapphire is about 85% or greater in a wavelength band of 400 to 1000 nm. As mentioned above, the cover glass 120 made of sapphire not only has durability against heat generation but also enables efficient diffusion and dissipation of heat to outside of spatial phase modulator 100.

An applicable band of the spatial phase modulator 100, in other words, a wavelength band of the pulsed light, may be from 400 nm to 1000 nm, in particular a wavelength range of visible light. However, in a case where the applicable band of the spatial phase modulator 100 is expanded or shifted to a wavelength band of ultraviolet ray, the material for the cover glass 120 may be changed to quartz.

Quartz shows higher transmissivity than sapphire in the ultraviolet-ray region. Quartz however has lower thermal conductivity than sapphire, which is merely about 1 W/mK. The material for the cover glass 120 can thus be selected between sapphire and quartz depending on the applicable band of the spatial phase modulator 100.

The transparent electrode layer 130 is formed as an ITO (indium tin oxide) transparent electrode layer. ITO is a wide gap semiconductor that has an energy band gap in the ultraviolet region. Considering the function the spatial phase modulator 100 should render, the transparent electrode layer 130 is required to have transmissivity and electric conductivity. Under this condition, it is appropriate to form the transparent electrode layer 130 using ITO.

Transmissivity of the transparent electrode layer 130 is however not high compared with other layers in the spatial phase modulator 100. In other words, in the transparent electrode layer 130, heat generation is likely to occur in response to receiving the pulsed light. In addition, the heat-proof temperature of the transparent electrode layer 130 is about 600° C. or less.

This heat generated in the transparent electrode layer 130 is efficiently dissipated to the outside of spatial phase modulator 100 owing to the high thermal conductivity of the cover glass 120. This high thermal conductivity of the cover glass 120 inhibits the thermal damage of the transparent electrode layer 130.

The first and second alignment film layer 140 and 160 is formed of the inorganic alignment film layer of silicon oxide (SiOx). The heat-proof temperature of a polyimide organic alignment film layer, which is conventionally often used as an alignment film layer, is 400° C. or less.

Meanwhile, the heat-proof temperature of the inorganic alignment film layer of silicon oxide (SiOx) is about 1000° C., which is higher than the heat-proof temperatures of the transparent electrode layer 130 and the liquid crystal layer 150. Owing to the above, in the present embodiment, it is possible to inhibit a situation where the first and second alignment film layer 140 and 160 are damaged before the transparent electrode layer 130 and the liquid crystal layer 150 are damaged, which disables the spatial phase modulator 100.

Furthermore, in the present embodiment, the reflection layer 170 that is non-metallic is disposed above the lower electrode layer 180. This inhibits the beat generation in the lower electrode layer 180. The lower electrode layer 180 includes an aluminum or gold electrode as the aforementioned electrode for each pixel.

More specifically, the reflection layer 170 includes a multi-layer structure of an inorganic material. Examples of the inorganic material include silicon dioxide (SiO2), titanium oxide (TiO2 or Ti2O3), and magnesium fluoride MgF2. Heat-proof temperature of the multi-layer structure of these inorganic materials is about 1100° C., which corresponds to melting points of these inorganic materials.

By using the multi-layer structure of the inorganic materials, it is possible to form the reflection layer 170 having the transmissivity of less than 1%, which enables inhibition of the heat generation in the reflection layer 170.

In addition, in the present embodiment, to improve the durability of the spatial phase modulator 100 against high-energy light, the liquid crystal layer 150 includes a liquid crystal composition to which a polymerization inhibitor for inhibiting radical polymerization is added.

The damage of the spatial phase modulator 100 includes those ascribable to beat generation as well as those ascribable to radical polymerization generated in the liquid crystal layer 150. Radical polymerization is one of polymerization reactions generated in response to light action. Shown below is a structural formula of nematic liquid crystal molecules having a tolan structure.

[Chemical Formula 1]

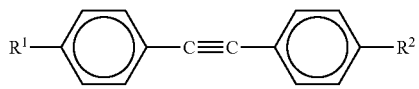

The liquid crystal composition is produced by mixing a plurality of liquid crystal compounds. Generally, liquid crystal compounds are low-molecular organic compounds, which have light sensitivity to irradiation of high-intensity light. The liquid crystal compounds are, for example, low-molecular organic compounds having stiff π-structures, flexible side chains, and polar groups.

Due to the above, a part of the structures of molecules of the liquid crystal compounds goes into an excited state by receiving the input light; and the liquid crystal compounds generate radicals. The chemical formula below explains the nematic liquid crystal molecule that has radicals generated by light action to the tolan structure.

[Chemical Formula 2]

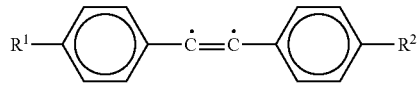

In the present embodiment, a liquid crystal mixture having a nematic liquid crystalline property in a broad range of temperature, including the room temperature, is used to form the liquid crystal layer 150. This liquid crystal mixture includes a nematic liquid crystal compound having the tolan structure.

This liquid crystal layer 150 is damaged by chain reaction of addition of monomers and progress of polymerization with highly active radicals, generated due to an action of the input light, being a chain propagation center. Accordingly, if the active radical can be inactivated by facilitating reaction to the active radical generated by the light action, this chain of polymerization reaction can be inhibited to stop the liquid crystal layer 150 from being damaged by the light action. To achieve this, in the present embodiment, an organic compound having a property of inhibiting radical polymerization is added to the liquid crystal mixture as the polymerization inhibitor to generate the liquid crystal composition.

Figure 3:
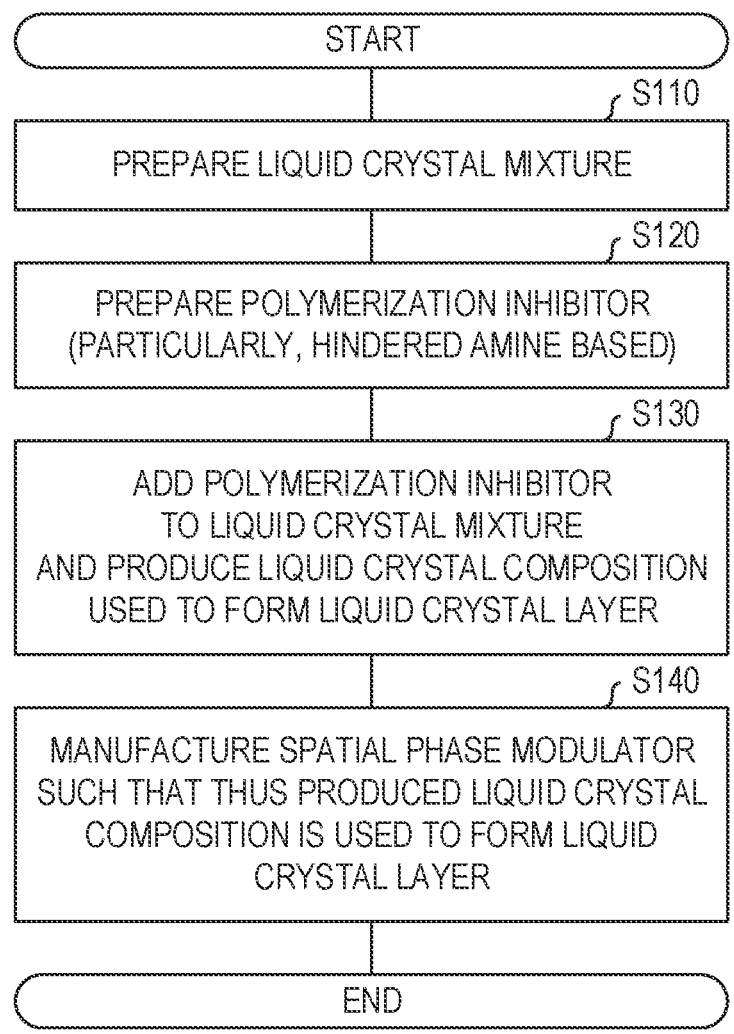
FIG. 3 is a flowchart explaining a method of manufacturing the spatial phase modulator.

In other words, in the present embodiment, the liquid crystal mixture made by mixing a plurality of liquid crystal compounds is prepared as a main material of the liquid crystal composition as shown in FIG. 3 (S110). The polymerization inhibitor is then prepared as an additive (S120). The liquid crystal composition is then produced by adding the polymerization inhibitor to the liquid crystal mixture (S130). The spatial phase modulator 100 is manufactured such that this liquid crystal composition is used to form the liquid crystal layer 150 (S140).

In the spatial phase modulator 100 thus produced, the polymerization inhibitor included in the liquid crystal layer 150 reacts with the active radical in the liquid crystal layer 150 and inactivates the active radical. Therefore, in the liquid crystal layer 150, the damage due to the radical polymerization can be inhibited by blocking a chain of the polymerization reaction.

In the present embodiment, in particular, a polymerization inhibitor that is soluble in the liquid crystal mixture and has low reaction to the liquid crystal mixture is used. In terms of easily dissolved in the liquid crystal mixture and in terms of not largely changing the physical properties of the liquid crystal composition, an organic compound that has a structure close to the liquid crystal molecular structure is selected as the polymerization inhibitor.

A liquid crystalline compound has a structure having both an aromatic ring such as a benzene ring and an alkyl group. In other words, the organic compound that has a structure close to the liquid crystal molecular structure is a chemical compound having both an aromatic ring structure and an alkyl group structure. In particular, an organic compound that has an alkyl group having carbon number 5 or more is easily dissolved in the liquid crystal mixture and thus is suited to be added at a high concentration.

To form the liquid crystal layer 150, one or more of organic compounds, which has a structure close to the liquid crystal molecular structure, are used as the polymerization inhibitor. Examples of particularly selectable polymerization inhibitors may include a phenol based organic compound and a hindered amine based organic compound. The inventor of the present disclosure found that, among them, the hindered amine based organic compound is favorable to be used as the polymerization inhibitor in terms of improving the durability.

Experimental results concerning the durability is shown below for both a case where the phenol based organic compound is used as the polymerization inhibitor, and a case where the hindered amine based organic compound is used as the polymerization inhibitor. Table 1 shows the experimental results.

TABLE 1

|  | Polymerization Inhibitor | Input Power Density (W/cm$^2$) | Polarizing Axis | Breaking Time (Hrs) |
| --- | --- | --- | --- | --- |
| Case 1 | Hindered Amine Based 4 wt % | 500 | Long Axis | 200 |
| Case 2 | Phenol Based 6 wt % | 500 | Long Axis | 57 |
| Case 3 | None | 500 | Long Axis | 20 |
| Case 4 | Phenol Based 6 wt % | 15 | Long Axis | 220 |
| Case 5 | Phenol Based 6 wt % | 15 | Shotr Axis | >1000 |

Experiment was conducted by using CW laser light with a wavelength of 450 nm being incident on liquid crystals having a configuration identical to one another except for the polymerization inhibitor. The phenol based organic compound used as the polymerization inhibitor was 2, 6-di-tert-butyl-p-cresol, the molecular structure of which is as shown below.

[Chemical Formula 3]

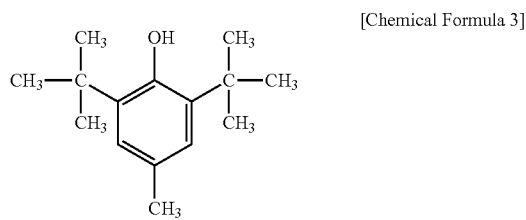 [SMILES: Cc1cc(C(C)(C)C)c(O)c(C(C)(C)C)c1]

The hindered amine based organic compound used as the polymerization inhibitor was bis (1-undecaneoxy-2, 2, 6, 6-tetramethylpiperidin-4-yl) carbonate, the molecular structure of which is as shown below.

[Chemical Formula 4]

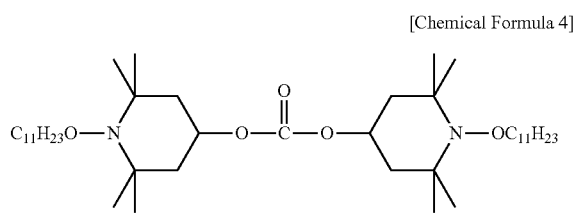

Case 1 in Table 1 shows a breaking time, which is a duration of time taken from the incidence of the CW laser light till a breakage of the liquid crystal was confirmed, when a linearly polarized light with input power density of 500 W/cm$^2$ was incident as the CW laser light on a liquid crystal, to which 4 wt. % of the hindered amine based organic compound was added as the polymerization inhibitor, such that a polarizing axis of the CW laser light was aligned with a long axis of the liquid crystal molecules. The breaking time in Case 1 was 200 hours.

Case 2 shows the breaking time when a linearly polarized light with input power density of 500 W/cm$^2$ was incident as the CW laser light on a liquid crystal, to which 6 wt. % of the phenol based organic compound was added as the polymerization inhibitor, such that the polarizing axis of the CW laser light was aligned with the long axis of the liquid crystal molecules. The breaking time in Case 2 was 57 hours.

Case 3 shows the breaking time when a linearly polarized light with input power density of 500 W/cm$^2$ was incident as the CW laser light on a liquid crystal, to which no polymerization inhibitor were added, such that the polarizing axis of the CW laser light was aligned with the long axis of the liquid crystal molecules. The breaking time in Case 3 was 20 hours.

Case 4 shows the breaking time when a linearly polarized light with input power density of 15 W/cm$^2$ was incident as the CW laser light on a liquid crystal, to which 6 wt. % of the phenol based organic compound was added as the polymerization inhibitor, such that the polarizing axis of the CW laser light was aligned with the long axis of the liquid crystal molecules. The breaking time in Case 4 was 220 hours.

Case 5 shows the breaking time when a linearly polarized light with input power density of 15 W/cm$^2$ was incident as the CW laser light on a liquid crystal, to which 6 wt. % of the phenol based organic compound was added as the polymerization inhibitor, such that the polarizing axis of the CW laser light was aligned with a short axis of the liquid crystal molecules. In Case 5, breakage could not be confirmed even after 1000 hours.

As it can be understood from Case 5, the breaking time largely differs depending on the direction of polarization of the incident light on the liquid crystal molecules. To reduce the breakage, it is preferred that a laser light that is incident on the liquid crystal is configured such that its polarizing axis is set parallel to the short axis of the liquid crystal molecules.

However, the spatial phase modulator 100 used in applications in laser processing use is required to have a large phase modulation factor. To achieve a maximum phase modulation factor, the polarizing axis of the laser light is required to be set parallel to the long axis of the liquid crystal molecules. In this case, as it can be understood from Table 1, the duration of life of the liquid crystal is shortened.

This leads to an understanding that the presence of the polymerization inhibitor is important for the spatial phase modulator 100 used in applications in laser processing use. This can also be understood from the difference in the breaking times between Case 1 or Case 2 and Case 3.

It is understood from the comparison between Case 1 and Case 2 that the effect of improving the durability by addition of the polymerization inhibitor is larger when using the hindered amine based organic compound as the polymerization inhibitor than when using the phenol based organic compound.

What should be noted here is that, when the polymerization inhibitor largely affects an alignment ability of the liquid crystal layer 150, it means that phase modulation ability of the spatial phase modulator 100 degrades. In addition, to add the polymerization inhibitor to the liquid crystal mixture, the polymerization inhibitor has to be dissolved in the liquid crystal mixture.

As mentioned above, the organic compound having a structure close to the liquid crystal molecular structure shows solubility in the liquid crystal mixture. Accordingly, for dissolution, it is preferable that the organic compound having an alkyl group and having a linear molecular structure is used as the polymerization inhibitor. It is also preferable that such organic compound has the molecular structure that does not physically inhibit the alignment of the liquid crystal molecules. It is also preferable that an organic compound having a short molecular chain is used as the polymerization inhibitor. In other words, a preferred example of the polymerization inhibitor is a monofunctional hindered amine based organic compound, or a bifunctional hindered amine based organic compound having a short molecular chain.

Examples of the monofunctional hindered amine based organic compound may include 4-hydroxy-2, 2, 6, 6-tetramethylpiperidin-N-oxyl, the molecular structure of which is as shown below.

[Chemical Formula 5]

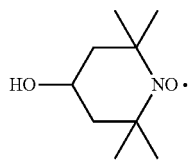

Examples of the bifunctional hindered amine based organic compound having a short molecular chain may include the aforementioned bis (1-undecaneoxy-2, 2, 6, 6-tetramethylpiperidin-4-yl) carbonate. Bis (1-undecaneoxy-2, 2, 6, 6-tetramethylpiperidin-4-yl) carbonate is an example of the hindered amine based organic compound having two functional groups coupled by a linking group including carbon-to-carbon bond having carbon number 1.

Other examples of the bifunctional hindered amine based organic compound may include sebacic acid bis (1, 2, 2, 6, 6-pentamethyl-4-piperidyl), the molecular structure of which is as shown below.

[Chemical Formula 6]

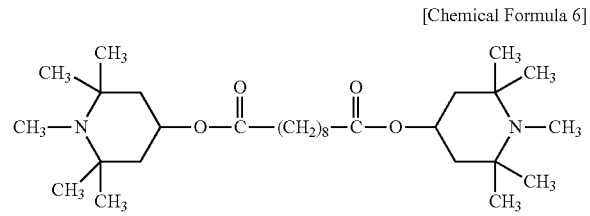

Sebacic acid bis (1, 2, 2, 6, 6-pentamethyl-4-piperidyl) is an example of the hindered amine based organic compound having two functional groups coupled by a linking group including carbon-to-carbon bond having carbon number 10.

As sebacic acid bis (1, 2, 2, 6, 6-pentamethyl-4-piperidyl) has a long molecular chain, it may not be possible to achieve sufficient alignment ability of the liquid crystal molecules. The experiment actually shows a decreasing tendency of a vertical alignment ability when a compound having a long chain alkyl group having carbon number 4 or more between two hindered amine structures, such as sebacic acid bis (1, 2, 2, 6, 6-pentamethyl-4-piperidyl), was added to a liquid crystal material and the liquid crystal composition was applied in a vertical-alignment liquid crystal device.

Accordingly, when using the bifunctional hindered amine based organic compound as the polymerization inhibitor, it is preferable to use the hindered amine based organic compound having two functional groups coupled by a linking group including carbon-to-carbon bond having carbon number 3 or less, such as the aforementioned bis (1-undecaneoxy-2, 2, 6, 6-tetramethylpiperidin-4-yl) carbonate. The inventor of the present disclosure has confirmed that the liquid crystal molecules can be aligned for practical applications if the linking group in the hindered amine based organic compound includes carbon-to-carbon bond having carbon number 3 or less.

Figure 4:
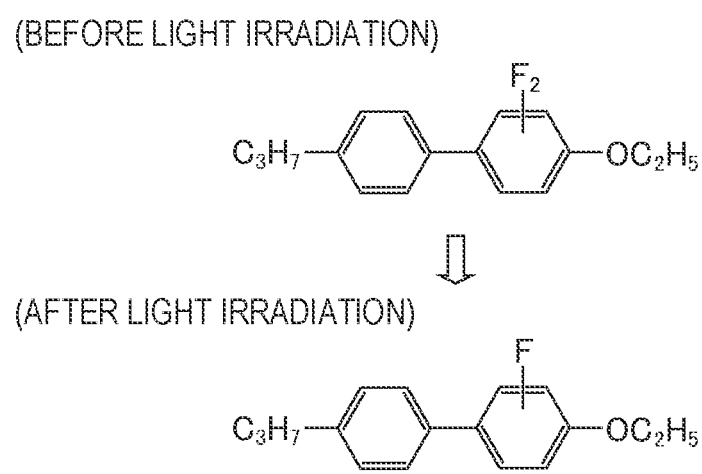
FIG. 4 is a diagram explaining defluorination by light irradiation.

The inventor of the present disclosure has also confirmed, as a result of comparing components of a liquid crystal damaged after light irradiation with components of a liquid crystal that did not undergo light irradiation, that defluoridation has occurred in a main component of the damaged liquid crystal as shown in FIG. 4. In other words, a choice of the liquid crystal material that would cause defluoridation leads to degradation of durability of the liquid crystal layer 150.

Accordingly, the liquid crystal mixture prepared for generating the liquid crystal composition (S110) preferably includes, as a main component, a liquid crystalline compound having no fluorine atom at its terminals. The liquid crystalline compound that shows the nematic liquid crystalline property generally has a linear structure as below.

[Chemical Formula 7]

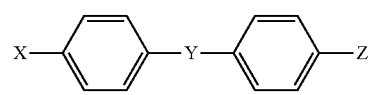

In other words, such liquid crystalline compound includes a structure in which rigid ring structures, such as benzene ring and cyclohexane ring, are coupled by a linking group Y, and the terminals X and Z are coupled to flexible substituent groups such as alkyl group, alkoxy group, cyano group, and fluorine atom. Durability is improved by choosing the liquid crystalline compound having no fluorine atoms at its terminals.

The aforementioned polymerization inhibitors may be added to the liquid crystal mixture in a range from 0.01 wt. % to 20 wt. %; more specifically, from 0.05 wt. % to 10 wt. %; yet more specifically, from 3 wt. % to 10 wt. %.

Due to the above, the liquid crystal layer 150 may include the liquid crystal composition containing the polymerization inhibitor in a range from 0.01 wt. % to 20 wt. %; more specifically, from 0.05 wt. % to 10 wt. %; yet more specifically, from 3 wt. % to 10 wt. %. Durability of the liquid crystal layer 150 against high-energy light is particularly improved by adding 3 wt. % or more of the polymerization inhibitor. The amount of the polymerization inhibitor to be added can be determined through experiments and the like to an amount that is optimum for inhibiting damage by radical polymerization while keeping the phase modulation property of the spatial phase modulator 100.

In addition, in the present embodiment, the vertical alignment (VA) liquid crystal layer is used as the liquid crystal layer 150 as mentioned above. The vertical alignment liquid crystal layer can modulate a phase without modulating intensity; it is therefore suited for the laser processing use.

There are mainly three methods of driving the liquid crystal, namely, TN (Twisted Nematic) method, VA (Vertical Alignment) method, and IPS (In-Plane-Switching) method.

Among them, the TN method and the IPS method are methods to obtain intensity modulation by controlling optical activity of the light by rotating the liquid crystal molecules in the liquid crystal layer parallel to a surface of the liquid crystal layer or by controlling the polarizing axis of the light incident on an inside of the liquid crystal layer from outside of the liquid crystal layer through the surface by utilizing phase difference between a fast axis and a slow axis in the liquid crystal layer. The phase modulation and the intensity modulation occur at the same time in these methods.

Meanwhile, the VA method controls the phase of the incident light by utilizing a difference of a refractive index of the liquid crystal molecules between an extraordinary ray and an ordinary ray, while avoiding a rotation of the polarizing axis of the incident light by rotating the liquid crystal molecules in the liquid crystal layer orthogonally to the surface of the liquid crystal layer, so as to obtain the phase modulation without intensity modulation. In the VA method, the liquid crystal molecules rotate in a thickness direction of the liquid crystal layer with a constant angle without rotating on the plane parallel to the surface of the liquid crystal layer. Since the VA method enables only the phase modulation without intensity modulation, effective phase modulation can be achieved.

The example embodiment of the present disclosure was described hereinbefore. The technique in the present disclosure is nevertheless very productive also in a laser irradiation of a light, the wavelength of which is less absorbed or not absorbed in the materials that forms the liquid crystal device, in that the liquid crystal material can be inhibited from being decomposed by an addition of the polymerization inhibitor.

It should be noted that the present disclosure should not be limited to the aforementioned embodiments and may be embodied in various modes. For example, the technique of the present disclosure should not be limited to the application to spatial phase modulator 100 but also can be applied to LCOS devices and liquid crystal devices of different usages.

Organic compounds used as the polymerization inhibitor should not be limited to hindered amine based organic compounds. Phenol based organic compounds may be used as the polymerization inhibitor to manufacture the spatial phase modulator 100.

Functions of one element in the aforementioned embodiments may be achieved by two or more elements. Functions of two or more elements in the aforementioned embodiments may be achieved by one element. A part of the configuration of the aforementioned embodiments may be omitted. At least a part of the configuration of the aforementioned embodiments may be added to or replaced with other part of the configuration of the aforementioned embodiments. Any and all modes included in the technical ideas identified by the languages recited in the claims are embodiments of the present disclosure.

The invention claimed is:

1. An optical system comprising:
   a light source;
   a controller; and
   a liquid crystal device, the liquid crystal device including:
     a liquid crystal layer; and
     an electrode layer configured to create an electric field in the liquid crystal layer,
   wherein the liquid crystal device is configured to be controlled by the controller to phase-modulate a laser light inputted from the light source so as to generate phase-modulated light corresponding to an image to be created on a processing-target surface, and to output the laser light that is modulated as the phase-modulated light,
   wherein the liquid crystal layer includes a liquid crystal composition that includes a liquid crystal mixture, to which a polymerization inhibitor for inhibiting radical polymerization caused by light action is added,
   wherein a bifunctional hindered amine based organic compound is added to the liquid crystal mixture as the polymerization inhibitor,
   wherein the bifunctional hindered amine based organic compound includes two functional groups coupled by a linking group including a carbon-to-carbon bond having a carbon number of 3 or less, and
   wherein the optical system is configured to process the processing-target surface by radiating the phase-modulated light onto the processing-target surface.

2. The optical system according to claim 1, wherein the bifunctional hindered amine based organic compound added as the polymerization inhibitor includes an aromatic ring structure and an alkyl group structure having carbon number 5 or more.

3. The optical system according to claim 1, wherein the liquid crystal mixture includes, as a main component, a liquid crystalline compound having no fluorine atoms at its terminal.

4. The optical system according to claim 1, wherein the liquid crystal layer is driven such that, due to a creation of the electric field, liquid crystal molecules rotate vertically relative to a surface of the liquid crystal layer without rotating parallel to the surface.

5. The optical system according to claim 1, wherein the liquid crystal layer is formed as a vertical alignment (VA) liquid crystal layer.

6. The optical system according to claim 1,
   wherein the electrode layer includes
   a transparent electrode layer positioned above the liquid crystal layer; and
   a lower electrode layer positioned below the liquid crystal layer,
   wherein alignment films for vertically controlling an initial alignment of liquid crystal molecules in the liquid crystal layer are disposed between the liquid crystal layer and the transparent electrode layer, and between the liquid crystal layer and the lower electrode layer, and
   wherein the liquid crystal layer is formed as a vertical alignment (VA) liquid crystal layer.

7. The optical system according to claim 1,
   wherein the liquid crystal mixture includes liquid crystalline compound having a tolan structure, and
   wherein the polymerization inhibitor inhibits radical polymerization caused by light action to the tolan structure.

8. The optical system according to claim 1, wherein the liquid crystal device is formed as an LCOS device having the electrode layer and the liquid crystal layer interposed between a silicon substrate and a cover glass.

9. The optical system according to claim 1, wherein the liquid crystal device receives an input of a linearly polarized light, as the laser light, that has polarized along a long axis of liquid crystal molecules in the liquid crystal layer.

10. A liquid-crystal-type spatial phase modulator comprising:
a transparent solid material layer configured to receive an input of light;
a transparent electrode layer disposed below the transparent solid material layer;
a first alignment film layer disposed below the transparent electrode layer;
a liquid crystal layer disposed below the first alignment film layer;
a second alignment film layer disposed below the liquid crystal layer;
a lower electrode layer disposed below the second alignment film layer; and
a silicon substrate disposed below the lower electrode layer,
wherein the transparent electrode layer is an indium tin oxide (ITO) transparent electrode layer,
wherein the first alignment film layer and the second alignment film layer are inorganic alignment film layers made of silicon oxide (SiOx), and
wherein the liquid crystal layer includes a liquid crystal composition that includes a liquid crystal mixture, to which a polymerization inhibitor for inhibiting radical polymerization caused by light action is added, and wherein a hindered amine based organic compound is added to the liquid crystal mixture as the polymerization inhibitor,
wherein the liquid crystal layer includes a liquid crystal composition in which a bifunctional hindered amine based organic compound is added to the liquid crystal mixture as the polymerization inhibitor
wherein the bifunctional hindered amine based organic compound includes two functional groups coupled by a linking group including carbon-to-carbon bond having carbon number 3 or less.

11. A method of manufacturing a liquid crystal device comprising:
creating a liquid crystal composition by adding, to a liquid crystal mixture, a hindered amine based organic compound as a polymerization inhibitor for inhibiting radical polymerization caused by light action, and
manufacturing the liquid crystal device that includes a liquid crystal layer having a property of inhibiting the radical polymerization by using the liquid crystal composition to form the liquid crystal layer,
wherein the liquid crystal layer includes the liquid crystal composition in which a bifunctional hindered amine based organic compound is added to the liquid crystal mixture as the polymerization inhibitor,
wherein the bifunctional hindered amine based organic compound includes two functional groups coupled by a linking group including a carbon-to-carbon bond having a carbon number of 3 or less, and
wherein the liquid crystal device is configured to phase-modulate a laser light inputted from a light source so as to generate phase-modulated light corresponding to an image to be created on a processing-target surface.

* * * * *